US009777623B2

(12) United States Patent
Nishio

(10) Patent No.: US 9,777,623 B2
(45) Date of Patent: Oct. 3, 2017

(54) FAILURE DETECTOR OF TURBOCHARGED ENGINE

(71) Applicant: Mazda Motor Corporation, Aki-gun, Hiroshima (JP)

(72) Inventor: Takafumi Nishio, Otake (JP)

(73) Assignee: Mazda Motor Corporation, Aki-gun, Hiroshima (JP)

(*) Notice: Subject to any disclaimer, the term of this patent is extended or adjusted under 35 U.S.C. 154(b) by 0 days.

(21) Appl. No.: 15/126,975

(22) PCT Filed: Feb. 18, 2015

(86) PCT No.: PCT/JP2015/000767
§ 371 (c)(1),
(2) Date: Sep. 16, 2016

(87) PCT Pub. No.: WO2015/141130
PCT Pub. Date: Sep. 24, 2015

(65) Prior Publication Data
US 2017/0122194 A1 May 4, 2017

(30) Foreign Application Priority Data
Mar. 19, 2014 (JP) .................. 2014-056831

(51) Int. Cl.
F02B 39/16 (2006.01)
F02B 37/18 (2006.01)
(Continued)

(52) U.S. Cl.
CPC ............ F02B 39/16 (2013.01); F02B 37/186 (2013.01); F02D 9/04 (2013.01); F02D 41/221 (2013.01)

(58) Field of Classification Search
CPC ........ F02B 37/12; F02B 37/18; F02B 37/183; F02B 37/186; F02B 37/22;
(Continued)

(56) References Cited

U.S. PATENT DOCUMENTS 4,774,812 A * 10/1988 Hitomi .................. F02B 33/446
60/601
4,982,567 A * 1/1991 Hashimoto ........... F02B 37/001
60/600

(Continued)

FOREIGN PATENT DOCUMENTS

JP      2533630 B2 *  9/1996
JP   2003328765 A    11/2003
(Continued)

OTHER PUBLICATIONS

ISA Japan Patent Office, International Search Report Issued in Application No. PCT/JP2015/000767, May 26, 2015, WIPO, 4 pages.
(Continued)

Primary Examiner — Mark Laurenzi
Assistant Examiner — Mickey France
(74) Attorney, Agent, or Firm — Alleman Hall Creasman & Tuttle LLP

(57) ABSTRACT

When opening or closing an exhaust cut valve in accordance with an operation range of an engine and performing feedback control for an opening degree of a wastegate valve such that a target supercharging pressure is achieved in each of an open operation range where the exhaust cut valve is opened and a closed operation range where the exhaust cut valve is closed, a failure of the exhaust cut valve can be accurately determined. Whether or not an abnormal state occurs is determined in each range. In the abnormal state, although feedback control for closing the wastegate valve is per-
(Continued)

formed, the actual supercharging pressure is lower than the target supercharging pressure, and a deviation between the actual supercharging pressure and the target supercharging pressure is maintained at not less than a predetermined value. Further, whether the exhaust cut valve is normal or in failure is determined.

6 Claims, 6 Drawing Sheets

(51) Int. Cl.
*F02D 41/22* (2006.01)
*F02D 9/04* (2006.01)

(58) Field of Classification Search
CPC ............... F02B 2037/122; F02B 39/16; F02B 2039/166; F02B 2039/168
USPC ... 60/597, 598, 599, 602, 603, 605.1, 605.2, 60/608, 614, 615
See application file for complete search history.

(56) References Cited

U.S. PATENT DOCUMENTS

| | | | | |
|---|---|---|---|---|
| 5,133,228 A | * | 7/1992 | Takata | B60W 30/18 477/33 |
| 5,140,817 A | * | 8/1992 | Matsuda | F02B 37/007 60/602 |
| 5,197,287 A | * | 3/1993 | Okimoto | F02B 37/18 60/600 |
| 5,201,790 A | * | 4/1993 | Mukai | F01N 1/166 123/383 |
| 5,205,191 A | * | 4/1993 | Takata | B60W 10/06 477/33 |
| 5,408,979 A | * | 4/1995 | Backlund | F02B 33/446 123/562 |
| 2007/0000248 A1 | * | 1/2007 | Gong | F02B 33/34 60/605.1 |
| 2007/0079612 A1 | * | 4/2007 | Grissom | F02B 37/013 60/602 |
| 2012/0017869 A1 | * | 1/2012 | Rammer | F01L 1/181 123/323 |
| 2012/0210711 A1 | * | 8/2012 | Petrovic | F02B 37/013 60/602 |
| 2013/0199179 A1 | * | 8/2013 | Kitsukawa | F02B 37/013 60/605.2 |

FOREIGN PATENT DOCUMENTS

| | | | |
|---|---|---|---|
| JP | 4263472 B2 | * | 5/2009 |
| JP | 4311021 B2 | * | 8/2009 |
| JP | 2010133303 A | * | 6/2010 |
| JP | 2011021504 A | * | 2/2011 |

OTHER PUBLICATIONS

ISA Japan Patent Office, English Translation of Written Opinion Issued in Application No. PCT/JP2015/000767, May 26, 2015, WIPO, 5 pages.

* cited by examiner

FAILURE DETECTOR OF TURBOCHARGED ENGINE

TECHNICAL FIELD

The present invention belongs to a technical field related to a failure detector of a turbocharged engine, the failure detector including an exhaust cut valve that can be switched between an open state and a closed state to switch a flow velocity of an exhaust gas of the engine between two velocities that are high and low velocities in front of a turbine of a turbocharger in an exhaust passage.

BACKGROUND ART

As described in PTL 1 for example, conventionally known is that: an exhaust passage through which an exhaust gas is supplied to a turbine is divided into two independent passages; an exhaust cut valve is disposed on one of the two passages and opens and closes the passage; and the exhaust cut valve is switched between an open state and a closed state to switch a flow velocity of the exhaust gas between two velocities that are high and low velocities in front of the turbine in the exhaust passage. To be specific, in an engine operation range where the amount of exhaust gas is small, the exhaust cut valve is set to the closed state, and the exhaust gas is supplied to the turbine through only one passage. With this, the flow velocity of the exhaust gas is made higher than the flow velocity of the exhaust gas of the exhaust passage that is not divided into two passages, and thus, a required supercharging effect is secured. In an operation range where the amount of exhaust gas is large, the exhaust cut valve is opened, and the exhaust gas is supplied to the turbine through all the passages. With this, a decrease in an engine output due to an increase in exhaust pressure is prevented.

PTL 1 further includes: an exhaust bypass passage through which the exhaust gas flows to bypass the turbine; and an exhaust bypass valve (wastegate valve) disposed on the exhaust bypass passage. In each of an open operation range where the exhaust cut valve is in the open state and a closed operation range where the exhaust cut valve is in the closed state, feedback control of an opening degree of the exhaust bypass valve is performed such that actual supercharging pressure becomes preset target supercharging pressure in accordance with engine operation states.

The above turbocharged engine cannot perform the above-described feedback control when an open/close function of the exhaust cut valve is in failure. In PTL 1, when the supercharging pressure is not more than a first set supercharging pressure value in the closed operation range, it is determined that a failure in which the exhaust cut valve is stuck in the open state occurs. On the other hand, when the supercharging pressure is not more than a second set supercharging pressure value in the open operation range, it is determined that a failure in which the exhaust cut valve is stuck in the closed state occurs.

CITATION LIST

Patent Literature

PTL 1: Japanese Laid-Open Patent Application Publication No. 2003-328765

SUMMARY OF INVENTION

Technical Problem

The exhaust cut valve is not provided with a sensor that detects the open state or closed state of the exhaust cut valve. Or, even if such a sensor is provided, the sensor does not directly detect the state of a valve main body that advances and retreats relative to the passage. For control of a driving source of the valve, the sensor may be provided at a portion close to the driving source. In this case, for example, when a part of a valve drive mechanism is in failure, and the exhaust cut valve is stuck in the open state or the closed state, it is difficult for the sensor to detect the failure of the exhaust cut valve.

Therefore, it is thought that the failure of the exhaust cut valve is detected by the determining method of PTL 1 described above. However, it is difficult for the determining method of PTL 1 to accurately determine the failure of the exhaust cut valve. To be specific, when a feedback amount for closing the wastegate valve is small, the supercharging pressure may not increase in each of the open operation range and the closed operation range. In this case, it cannot be necessarily said that the exhaust cut valve is in failure. Further, in PTL 1, whether or not the exhaust cut valve is in failure is determined in each of the open operation range and the closed operation range. Therefore, it cannot be necessarily said that the failure of the exhaust cut valve can be accurately determined.

The present invention was made in consideration of these circumstances, and an object of the present invention is to: switch an exhaust cut valve between an open state and a closed state in accordance with an operation range of an engine; and accurately determine a failure of the exhaust cut valve when feedback control of an opening degree of a wastegate valve is performed such that actual supercharging pressure becomes target supercharging pressure in each of an open operation range where the exhaust cut valve is in the open state and in a closed operation range where the exhaust cut valve is in the closed state.

Solution to Problem

To achieve the above object, the present invention is directed to a failure detector of a turbocharged engine, the failure detector including: a turbocharger including a turbine disposed on an exhaust passage of the engine and a compressor disposed on an intake passage of the engine; an exhaust cut valve configured to be switched between an open state and a closed state to switch a flow velocity of an exhaust gas of the engine between two velocities that are high and low velocities in front of the turbine in the exhaust passage; an exhaust bypass passage through which the exhaust gas flows so as to bypass the turbine; a wastegate valve disposed on the exhaust bypass passage; a supercharging pressure detector configured to detect supercharging pressure of intake air supercharged by the compressor; and a valve control device configured to switch the exhaust cut valve between the open state and the closed state in accordance with an operation range of the engine and perform feedback control for an opening degree of the wastegate valve such that actual supercharging pressure detected by the supercharging pressure detector becomes target supercharging pressure preset in accordance with an operation state of the engine in each of an open operation range where the exhaust cut valve becomes the open state and a closed operation range where the exhaust cut valve becomes the closed state, wherein: the valve control device is configured to determine whether or not an abnormal state occurs in each of the closed operation range and the open operation range, the abnormal state being a state where although the feedback control in which a feedback amount for closing the wastegate valve is not less than a predetermined amount is performed, the actual supercharging pressure is lower than the target supercharging pressure, and a deviation between the actual supercharging pressure and the target supercharging pressure is maintained at not less than a predetermined value and determine based on results of the determinations in the above two operation ranges whether the exhaust cut valve is normal or in failure.

According to the above configuration, in each of the operation ranges, when the actual supercharging pressure does not converge to the target supercharging pressure although the feedback amount for closing the wastegate valve is large, it is determined in consideration of the feedback amount that the abnormal state occurs. Therefore, whether or not the abnormal state occurs can be accurately determined. Further, based on the results of the determinations regarding whether or not the abnormal state occurs in each of the two operation ranges, whether the exhaust cut valve is normal or in failure is determined. Therefore, whether the exhaust cut valve is normal or in failure can be accurately determined.

One embodiment of the failure detector of the turbocharged engine is configured such that when the valve control device determines that the abnormal state occurs only in the closed operation range out of the above two operation ranges, the valve control device determines that the exhaust cut valve is stuck in the open state.

With this, the failure in which the exhaust cut valve is stuck in the open state can be accurately determined.

Another embodiment of the failure detector of the turbocharged engine is configured such that when the valve control device determines that the abnormal state occurs only in the open operation range out of the above two operation ranges, the valve control device determines that the exhaust cut valve is stuck in the closed state.

With this, the failure in which the exhaust cut valve is stuck in the closed state can be accurately determined.

In the failure detector of the turbocharged engine, it is preferable that until a first predetermined time elapses since shifting of the operation range to the open operation range or the closed operation range, the valve control device do not determine whether or not the abnormal state occurs.

To be specific, until the first predetermined time elapses since the shifting of the operation range (the first predetermined time is substantially equal to a time it takes to complete the shifting of the exhaust cut valve to the open state or the closed state and is, for example, five seconds), the supercharging pressure is unstable, so that it is difficult to accurately determine whether or not the abnormal state occurs. Therefore, after the first predetermined time elapses since the shifting of the operation range, whether or not the abnormal state occurs is determined. With this, this determination can be accurately performed.

In the above case, the valve control device may be configured such that: when the valve control device determines after the first predetermined time since the shifting of the operation range that the abnormal state occurs only within a second predetermined time since the elapse of the first predetermined time and only in the closed operation range out of the above two operation ranges, the valve control device determines that a delay failure of an operation of shifting from the open state to the closed state by the exhaust cut valve occurs; when the valve control device determines after the first predetermined time since the shifting of the operation range that the abnormal state occurs only within the second predetermined time since the elapse of the first predetermined time and only in the open operation range out of the above two operation ranges, the valve control device determines that a delay failure of an operation of shifting from the closed state to the open state by the exhaust cut valve occurs; and when the valve control device determines after the first predetermined time since the shifting of the operation range that the abnormal state occurs only within the second predetermined time since the elapse of the first predetermined time and in each of the above two operation ranges, the valve control device determines that both the delay failure of the operation of shifting from the open state to the closed state by the exhaust cut valve 43 and the delay failure of the operation of shifting from the closed state to the open state by the exhaust cut valve occur.

With this, although the exhaust cut valve becomes normal late at an initial stage after the shifting of the operation range in some cases, such operation delay of the exhaust cut valve can also be detected.

Yet another embodiment of the failure detector of the turbocharged engine is configured such that when the valve control device determines that the abnormal state occurs in each of the operation ranges, the valve control device determines that the exhaust cut valve is stuck in a state between the open state and the closed state, or a feedback control system for the opening degree of the wastegate valve is in failure.

With this, a failures (failure in which the exhaust cut valve is stuck in a state between the open state and the closed state) other than the failure in which the exhaust cut valve is stuck in the open state or the closed state and the failure (the failure of the wastegate valve itself) of the feedback control system for the opening degree of the wastegate valve can be detected.

Advantageous Effects of Invention

As explained above, according to the failure detector of the turbocharged engine of the present invention, whether or not the abnormal state occurs is determined in each of the open operation range and the closed operation range, the abnormal state being a state where although the feedback control in which the feedback amount for closing the wastegate valve is not less than the predetermined amount is performed, the actual supercharging pressure is lower than the target supercharging pressure, and the deviation between the actual supercharging pressure and the target supercharging pressure is maintained at not less than the predetermined value. In addition, whether the exhaust cut valve is normal or in failure is determined based on the results of the determinations in the above two operation ranges. With this, whether or not the exhaust cut valve is normal or in failure can be accurately determined. Further, failures other than the failure in which the exhaust cut valve is stuck in the open state or the closed state and the failure of the feedback control system for the opening degree of the wastegate valve other than the exhaust cut valve can be detected.

DESCRIPTION OF EMBODIMENTS

Hereinafter, an embodiment of the present invention will be explained in detail in reference to the drawings.

Figure 1:
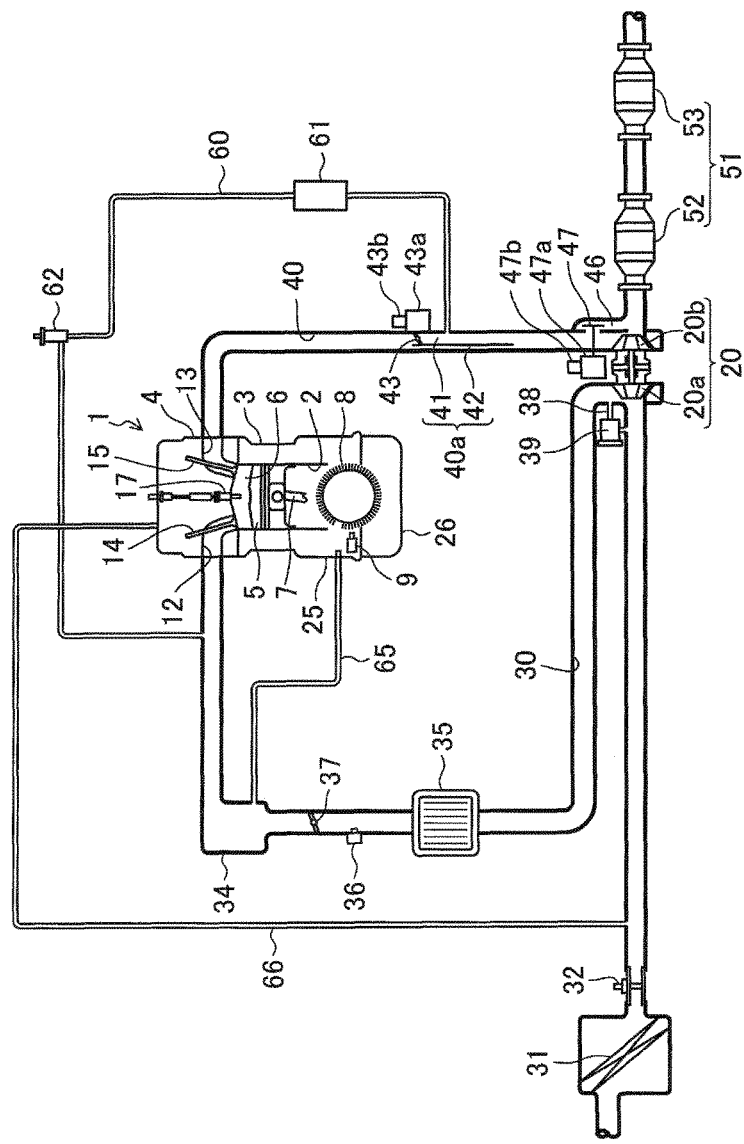
FIG. 1 is a diagram showing a schematic configuration of a turbocharged engine to which a failure detector according to an embodiment of the present invention is applied.

FIG. 1 shows a schematic configuration of a turbocharged engine 1 (hereinafter simply referred to as an "engine 1") to which a failure detector according to the embodiment of the present invention is applied. The engine 1 is a gasoline engine mounted on a vehicle and includes: a cylinder block 3 provided with a plurality of cylinders 2 (FIG. 1 shows only one cylinder); and a cylinder head 4 provided on the cylinder block 3. Pistons 5 are fittingly inserted in the respective cylinders 2 of the engine 1 so as to be able to reciprocate. Each of combustion chambers 6 is defined between the cylinder head 4 and each piston 5. The pistons 5 are coupled to a crank shaft (not shown) through connecting rods 7. A detection plate 8 for detecting a rotation angle position of the crank shaft is fixed to the crank shaft so as to rotate integrally with the crank shaft, and an engine revolution sensor 9 that detects the rotation angle position of the detection plate 8 to detect the revolution of the engine 1 is provided. The crank shaft is provided in a crank case 25 provided under the cylinder block 3, and an oil pan 26 is provided under the crank case 25.

Intake ports 12 and exhaust ports 13 are formed on the cylinder head 4 for the respective cylinders 2, and intake valves 14 and exhaust valves 15 are provided at the cylinder head 4 so as to open and close openings of the intake ports 12 and the exhaust ports 13, the openings being located close to the combustion chambers 6. The intake valves 14 are driven by an intake valve drive mechanism (not shown), and the exhaust valves 15 are driven by an exhaust valve drive mechanism (not shown). The intake valves 14 and the exhaust valves 15 reciprocate by the intake valve drive mechanism and the exhaust valve drive mechanism at predetermined timings to open and close the intake ports 12 and the exhaust ports 13, thereby performing gas exchange in the cylinders 2. Each of the intake valve drive mechanism and the exhaust valve drive mechanism includes an intake camshaft and an exhaust camshaft which are drivingly connected to the crank shaft, and these camshafts rotate in sync with the rotation of the crank shaft. Further, at least the intake valve drive mechanism out of these two valve drive mechanisms is configured to include a liquid pressure type or mechanical type variable phase mechanism (Variable Valve Timing; VVT) capable of continuously changing a phase of the intake camshaft within a predetermined angular range.

Injectors 17 that inject fuel are provided at the cylinder head 4 so as to be located on respective central axes of the cylinders 2. Each of the injectors 17 is provided such that a fuel injection opening thereof faces the combustion chamber 6 from a ceiling surface of the combustion chamber 6. The injector 17 directly injects and supplies the fuel to the combustion chamber 6 in the vicinity of a compression stroke top dead center.

The cylinder head 4 is provided with spark plugs (not shown). Each of tip end portions (electrodes) of the spark plugs faces a vicinity adjacent to the fuel injection opening of the injector 17 at a ceiling portion of the combustion chamber 6. The spark plug generates a spark at a desired ignition timing.

An intake passage 30 is connected to one of surfaces of the engine 1 so as to communicate with the intake ports 12 of the cylinders 2. An air cleaner 31 that filters intake air is provided at an upstream end portion of the intake passage 30. The intake air filtered by the air cleaner 31 is supplied to the combustion chambers 6 of the cylinders 2 through the intake passage 30 and the intake ports 12.

An air flow sensor 32 that detects the flow rate of the intake air taken in the intake passage 30 is disposed on the intake passage 30 so as to be located in the vicinity of a downstream side of the air cleaner 31. A surge tank 34 is provided in the vicinity of a downstream end of the intake passage 30. The intake passage 30 provided downstream of the surge tank 34 is constituted by independent passages that are branched for the respective cylinders 2. Downstream ends of the independent passages are connected to the respective intake ports 12 of the cylinders 2.

A compressor 20a of a turbocharger 20 is disposed on the intake passage 30 so as to be located between the air flow sensor 32 and the surge tank 34. Supercharging of the intake air is performed by an operation of the compressor 20a.

An intercooler 35 that cools the air compressed by the compressor 20a, a supercharging pressure detection sensor 36 (supercharging pressure detector) that detects the supercharging pressure of the intake air compressed by the compressor 20a, and a throttle valve 37 are disposed on the intake passage 30 so as to be located between the compressor 20a of the turbocharger 20 and the surge tank 34 in this order from the upstream side. The throttle valve 37 changes a cross-sectional area of a portion, where the throttle valve 37 is provided, of the intake passage 30 to adjust the amount of intake air supplied to the combustion chambers 6 of the cylinders 2.

In the present embodiment, an intake bypass passage 38 that bypasses the compressor 20a is provided at the intake passage 30, and an air bypass valve 39 is disposed on the intake bypass passage 38. Normally, the air bypass valve 39 is in a completely closed state. For example, when the throttle valve 37 is quickly closed, the pressure in the intake passage 30 located upstream of the throttle valve 37 rapidly increases, and surging occurs. Thus, the rotation of the compressor 20a is disrupted, and this generates loud sound. To prevent this, the air bypass valve 39 is opened.

An exhaust passage 40 through which the exhaust gas is discharged from the combustion chambers 6 of the cylinders 2 is connected to the other surface of the engine 1. An upstream portion of the exhaust passage 40 is constituted by an exhaust manifold including: independent passages that are branched for the respective cylinders 2 and connected to respective outside ends of the exhaust ports 13; and a collecting portion where the independent passages collect. A turbine 20b of the turbocharger 20 is disposed on the exhaust passage 40 so as to be located downstream of the exhaust manifold. The turbine 20b rotates by the flow of the exhaust gas, and the compressor 20*a* coupled to the turbine 20*b* operates by the rotation of the turbine 20*b*.

The exhaust passage 40 located downstream of the exhaust manifold and upstream of the turbine 20*b* is constituted by a divided portion 40*a* that is divided into a first passage 41 and a second passage 42 that is smaller in cross-sectional area than the first passage 41. A sum of the cross-sectional area of the first passage 41 and the cross-sectional area of the second passage 42 is substantially equal to the cross-sectional area of the exhaust passage 40 located downstream of the exhaust manifold and upstream of the divided portion 40*a*.

An exhaust cut valve 43 is disposed on the first passage 41. The exhaust cut valve 43 can be switched between a closed state and an open state by driving of an exhaust cut valve motor 43*a*. The exhaust cut valve 43 completely closes the first passage 41 in the closed state and completely opens the first passage 41 in the open state. With this, at the divided portion 40*a* of the exhaust passage 40 (i.e., in front of the turbine 20*b*), the flow velocity of the exhaust gas of the engine 1 can be switched between two velocities that are high and low velocities. To be specific, when the exhaust cut valve 43 is in the open state, the flow velocity of the exhaust gas at the divided portion 40*a* is substantially equal to the flow velocity of the exhaust gas at the exhaust passage 40 located downstream of the exhaust manifold and upstream of the divided portion 40*a*. However, the flow velocity of the exhaust gas at the divided portion 40*a* (second passage 42) when the exhaust cut valve 43 is in the closed state is higher than that when the exhaust cut valve 43 is in the open state.

Although the configuration of the exhaust cut valve 43 is not shown, the exhaust cut valve 43 includes: a slide member that is directly driven by the exhaust cut valve drive motor 43*a* to slide; a valve main body that reciprocates relative to the first passage 41 in conjunction with the sliding of the slide member; a link mechanism that connects the slide member and the valve main body; and an exhaust cut valve position sensor 43*b* that detects a slide position of the slide member. A below-described control unit 100 controls the exhaust cut valve drive motor 43*a* based on position information from the exhaust cut valve position sensor 43*b* to cause the exhaust cut valve 43 to become the open state or the closed state. According to this configuration, the exhaust cut valve 43 can be set to a state (intermediate opening degree) between the open state and the closed state. However, in the present embodiment, the exhaust cut valve 43 is set only to the open state or the closed state (It should be noted that the exhaust cut valve 43 may be stuck in the state of the intermediate opening degree). In the present embodiment, the exhaust cut valve 43 is driven by the exhaust cut valve drive motor 43*a*. However, the present embodiment is not limited to this, and for example, a solenoid valve may be used. In this case, the exhaust cut valve position sensor 43*b* can be omitted.

An exhaust bypass passage 46 through which the exhaust gas of the engine 1 (in the present embodiment, the exhaust gas whose flow velocity has been switched to the high or low velocity by the exhaust cut valve 43) flows so as to bypass the turbine 20*b* is provided at the exhaust passage 40. An exhaust gas inflow end portion (upstream end portion) of the exhaust bypass passage 46 is connected to a portion of the exhaust passage 40, the portion being located between the divided portion 40*a* and the turbine 20*b*. An exhaust gas outflow end portion (downstream end portion) of the exhaust bypass passage 46 is connected to a portion of the exhaust passage 40, the portion being located downstream of the turbine 20*b* and upstream of a below-described exhaust purifier 51. It should be noted that the exhaust bypass passage 46 may bypass both the divided portion 40*a* and the turbine 20*b* (the upstream end portion of the exhaust bypass passage 46 may be connected to a portion of the exhaust passage 40, the portion being located upstream of the divided portion 40*a*).

A wastegate valve 47 is provided at the exhaust gas inflow end portion of the exhaust bypass passage 46. When the opening degree of the wastegate valve 47 is 0% (completely closed), the entire amount of exhaust gas whose flow velocity has been switched by the exhaust cut valve 43 flows to the turbine 20*b*. When the opening degree of the wastegate valve 47 is an opening degree other than 0%, the flow rate of the exhaust gas flowing to the exhaust bypass passage 46 (i.e., the flow rate of the exhaust gas flowing to the turbine 20*b*) changes depending on the opening degree. To be specific, as the opening degree of the wastegate valve 47 increases, the flow rate of the exhaust gas flowing to the exhaust bypass passage 46 increases, and the flow rate of the exhaust gas flowing to the turbine 20*b* decreases. It should be noted that the wastegate valve 47 may be provided anywhere on the exhaust bypass passage 46 in a length direction of the exhaust bypass passage 46.

The wastegate valve 47 is similar in configuration to the exhaust cut valve 43. The wastegate valve 47 includes: a wastegate valve drive motor 47*a*; a slide member that is directly driven by the wastegate valve drive motor 47*a* to slide; a valve main body that reciprocates relative to the exhaust gas inflow end portion of the exhaust bypass passage 46 in conjunction with the sliding of the slide member; a link mechanism that connects the slide member and the valve main body; and a wastegate valve opening degree sensor 47*b* (constituted by a position sensor) that detects the slide position of the slide member.

The exhaust purifier 51 that purifies harmful components in the exhaust gas is disposed on the exhaust passage 40 so as to be located downstream of the turbine 20*b* (i.e., downstream of a portion to which the downstream end portion of the exhaust bypass passage 46 is connected). The exhaust purifier 51 includes: an oxidation catalyst 52 that supports platinum, platinum to which palladium is added, or the like and oxidizes CO and HC in the exhaust gas; and a lean NOx catalyst 53 that treats (traps) NOx in the exhaust gas to prevent NOx from being discharged to the atmosphere. The lean NOx catalyst 53 is provided downstream of the oxidation catalyst 52 so as to be separated from the oxidation catalyst 52.

The engine 1 includes an EGR passage 60 through which a part of the exhaust gas returns to the intake passage 30 from the exhaust passage 40. The EGR passage 60 connects the first passage 41 of the divided portion 40*a* of the exhaust passage 40 and the independent passages located downstream of the surge tank 34 on the intake passage 30. An EGR cooler 61 and an EGR valve 62 are disposed on the EGR passage 60. The EGR cooler 61 cools the exhaust gas flowing through the EGR passage 60, and the EGR valve 62 changes a cross-sectional area of the EGR passage 60. The flow rate of the exhaust gas returned through the EGR passage 60 is adjusted by the EGR valve 62.

The engine 1 includes first and second ventilation hoses 65 and 66 through which a blowby gas leaking from the combustion chambers 6 is returned to the intake passage 30. The first ventilation hose 65 connects the crank case 25 provided under the cylinder block 2 and the surge tank 34. The second ventilation hose 66 connects an upper portion of the cylinder head 4 and a portion of the intake passage 30, the portion being located between the air cleaner 31 and the compressor 20*a*. A check valve (not shown) that allows only the flow of the blowby gas toward the surge tank 34 is provided at an end portion of the first ventilation hose 65, the end portion being located close to the crank case 25.

Figure 2:
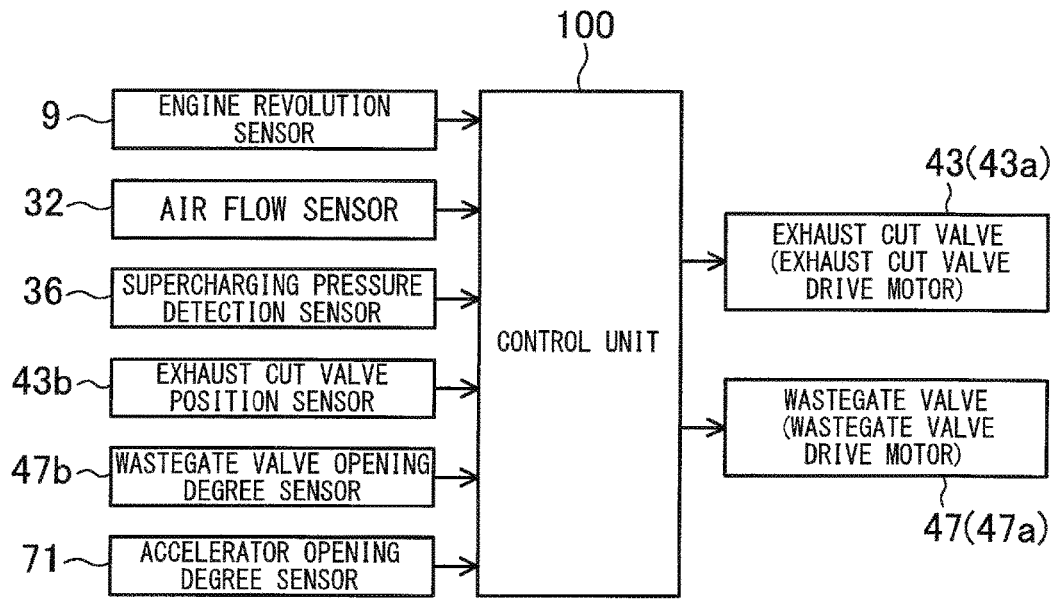
FIG. 2 is a block diagram showing a configuration of a control system for an exhaust cut valve and a wastegate valve.

As shown in FIG. 2, in the present embodiment, the control unit 100 is provided as a valve control device that controls the exhaust cut valve 43 (exhaust cut valve drive motor 43*a*) and the wastegate valve 47 (wastegate valve drive motor 47*a*). In the present embodiment, the control unit 100 controls the entire operations of the engine 1. However, FIG. 2 shows only a control system for the exhaust cut valve 43 and the wastegate valve 47.

The control unit 100 is a controller basically constituted by a known microcomputer. The control unit 100 includes: a central processing unit (CPU) that executes a program; a memory constituted by, for example, a RAM or a ROM and storing the program and data; and an input/output (I/O) bus that receives and transmits electric signals.

The control unit 100 receives signals of sensor values from the engine revolution sensor 9, the air flow sensor 32, the supercharging pressure detection sensor 36, the exhaust cut valve position sensor 43*b*, the wastegate valve opening degree sensor 47*b*, and an accelerator opening degree sensor 71 that detects an accelerator opening degree. Based on these input signals, the control unit 100 controls the exhaust cut valve 43 and the wastegate valve 47 in the following manner.

Figure 3:
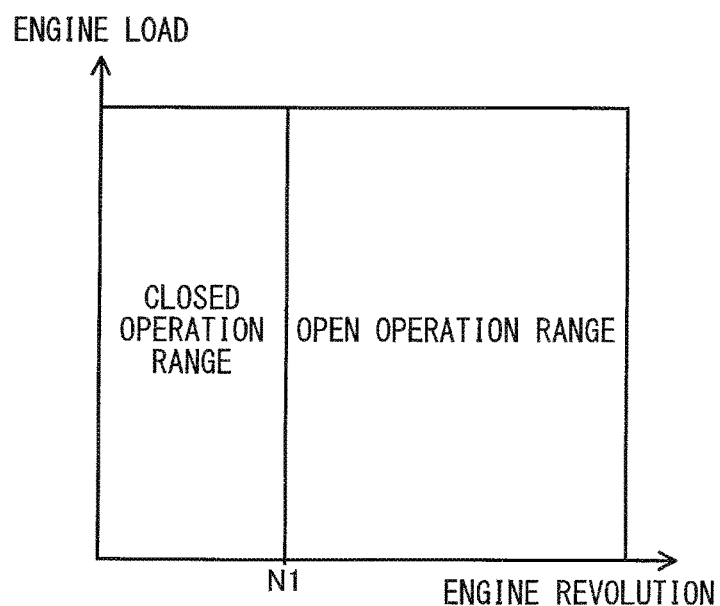
FIG. 3 is a diagram showing an exhaust cut valve open operation range and closed operation range of the engine.

The control unit 100 switches the exhaust cut valve 43 between the open state and the closed state in accordance with the operation range of the engine 1. Specifically, in the present embodiment, as shown in FIG. 3, in an open operation range where an engine revolution is higher than a predetermined revolution N1 (2,000 rpm, for example), the exhaust cut valve 43 is set to the open state. In a closed operation range where the engine revolution is not higher than the predetermined revolution N1, the exhaust cut valve 43 is set to the closed state. To be specific, in the closed operation range (low revolution range where the engine revolution is not higher than the predetermined revolution N1) where the amount of exhaust gas is small, the exhaust gas is supplied to the turbine 20*b* through only the second passage 42. With this, the flow velocity of the exhaust gas at the divided portion 40*a* (second passage 42) is made high, so that a required supercharging effect is secured. In the open operation range (high revolution range where the engine revolution is higher than the predetermined revolution N1) where the amount of exhaust gas is large, the exhaust gas is supplied to the turbine 20*b* through the first and second passages 41 and 42. With this, an increase in the exhaust pressure is prevented, so that a decrease in an engine output due to an increase in the exhaust pressure is prevented.

The control unit 100 performs feedback control of the opening degree of the wastegate valve 47 such that actual supercharging pressure detected by the supercharging pressure detection sensor 36 becomes preset target supercharging pressure in accordance with operation states of the engine 1 in each of the open operation range where the exhaust cut valve 43 is in the open state and the closed operation range where the exhaust cut valve 43 is in the closed state. Therefore, the control unit 100 constitutes the valve control device of the present invention.

Based on a first map prestored in the memory of the control unit 100, the target supercharging pressure is set in accordance with the engine revolution and an engine load that are the operation states of the engine 1. The engine load can be obtained by the input signals from the air flow sensor 32 and the like. In addition to the first map, the memory prestores a second map by which a basic opening degree of the wastegate valve 47 is set in accordance with the engine revolution and the engine load that are the operation states of the engine 1.

Figure 4:
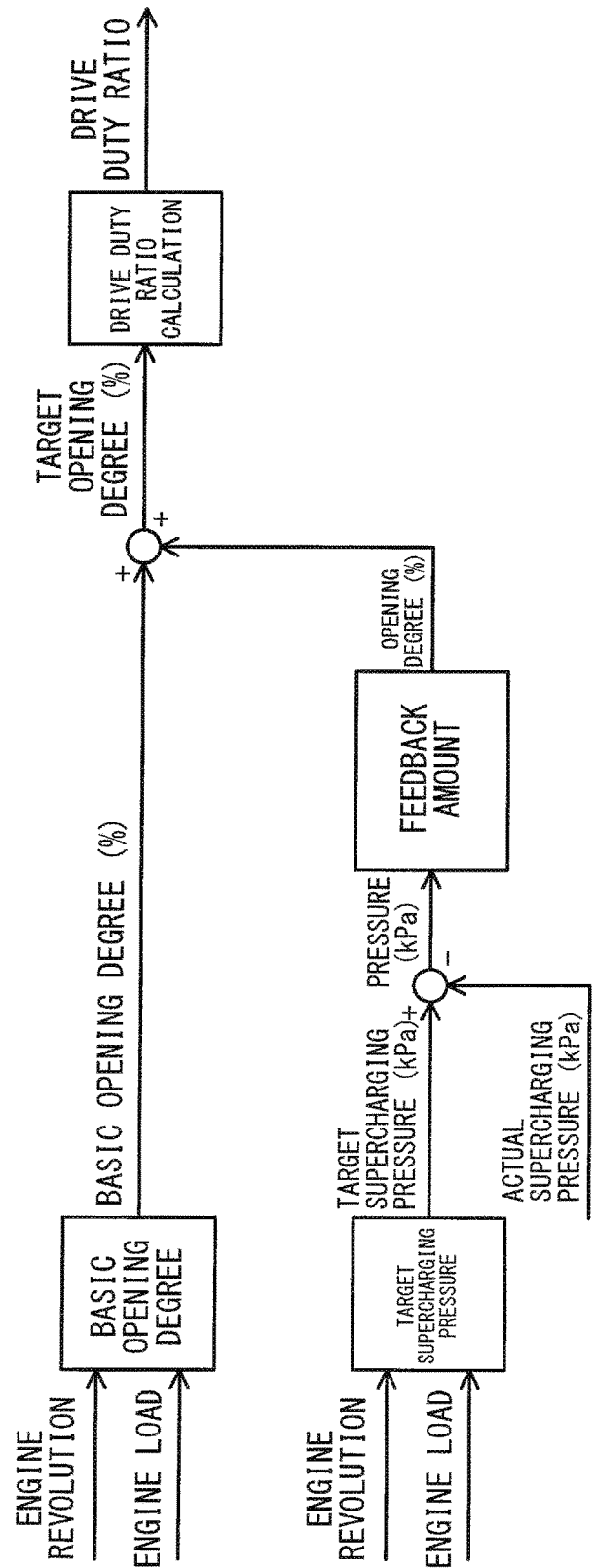
FIG. 4 is a block diagram showing a configuration of control of an opening degree of the wastegate valve by a control unit.

FIG. 4 is a block diagram showing a configuration of control of the opening degree of the wastegate valve 47 by the control unit 100.

The target supercharging pressure is set in accordance with the engine revolution and the engine load based on the first map, and the basic opening degree of the wastegate valve 47 is set in accordance with the engine revolution and the engine load based on the second map. Then, a feedback amount (opening degree) is calculated in accordance with a pressure value obtained by subtracting the actual supercharging pressure, detected by the supercharging pressure detection sensor 36, from the target supercharging pressure. When the pressure value obtained by subtracting the actual supercharging pressure from the target supercharging pressure is a positive value, the feedback amount is a negative value. An absolute value of the feedback amount increases as the pressure value increases. It should be noted that the absolute value of the feedback amount is limited by a preset closed-side maximum feedback amount. In contrast, when the above pressure value is a negative value, the feedback amount is a positive value. The feedback amount increases as the absolute value of the pressure value increases. It should be noted that the feedback amount is limited by a preset open-side maximum feedback amount (which is equal to the closed-side maximum feedback amount in the present embodiment but may be different from the closed-side maximum feedback amount).

Next, a target opening degree of the wastegate valve 47 is set by correcting the basic opening degree by the feedback amount. To be specific, the target opening degree is set by adding the feedback amount to the basic opening degree. When the feedback amount is a positive value, the wastegate valve 47 is corrected to the open-side. When the feedback amount is a negative value, the wastegate valve 47 is corrected to the closed-side.

Next, a duty ratio (drive duty ratio) of a voltage applied to the wastegate valve drive motor 47*a* is calculated in accordance with the target opening degree set as above, and the wastegate valve drive motor 47*a* is driven at the drive duty ratio. At this time, the drive duty ratio is adjusted in accordance with an actual opening degree detected by the wastegate valve opening degree sensor 47*b*. The drive duty ratio decreases as a deviation between the actual opening degree and the target opening degree decreases. When the actual opening degree is equal to the target opening degree, the drive duty ratio is zero, and the wastegate valve drive motor 47*a* stops.

Figure 5:
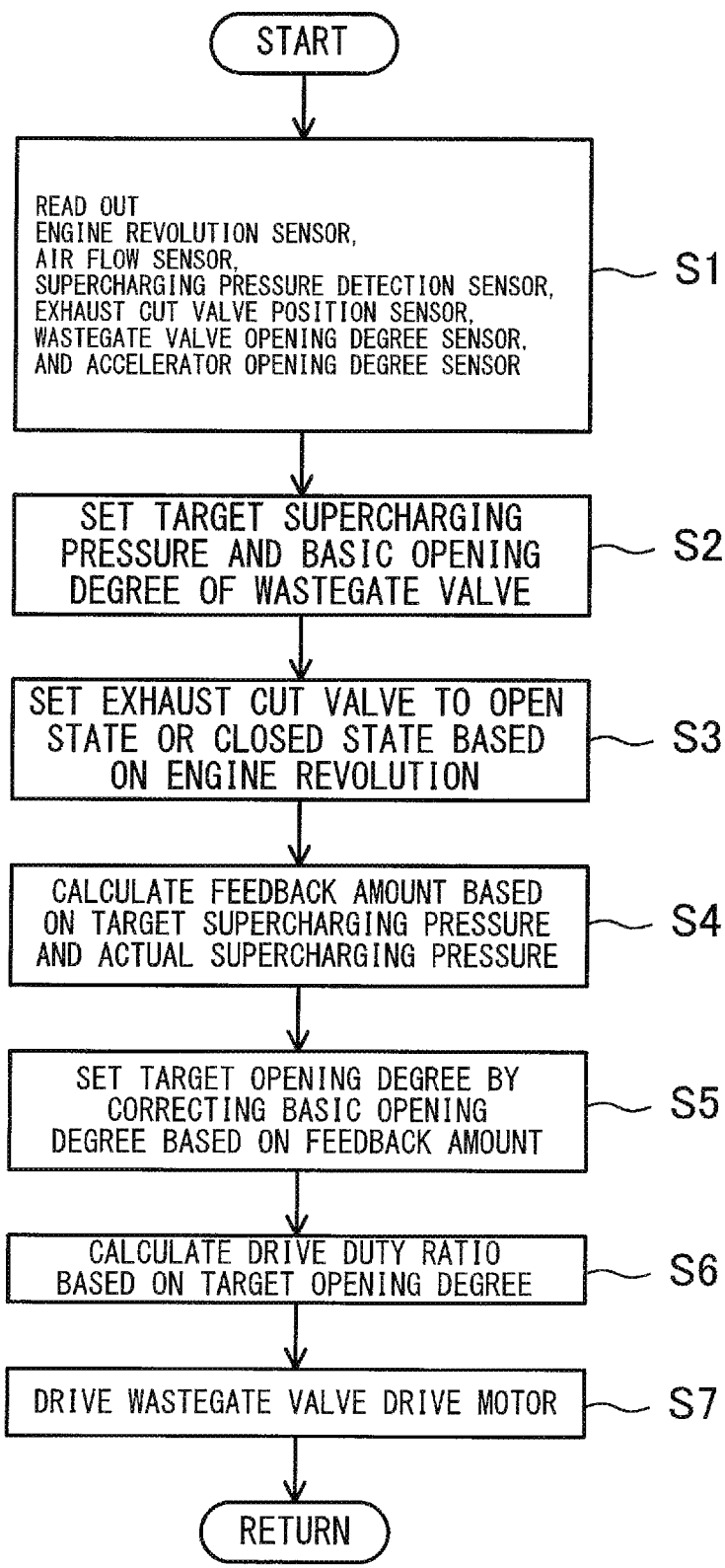
FIG. 5 is a flow chart showing operations of controlling the exhaust cut valve and the wastegate valve by the control unit.

Operations of controlling the exhaust cut valve 43 and the wastegate valve 47 by the control unit 100 will be explained in reference to the flow chart of FIG. 5.

To be specific, in Step S1, the control unit 100 reads out the sensor values from the engine revolution sensor 9, the air flow sensor 32, the supercharging pressure detection sensor 36, the exhaust cut valve position sensor 43*b*, the wastegate valve opening degree sensor 47*b*, and the accelerator opening degree sensor 71.

In Step S2, the engine load is obtained from the intake air flow rate detected by the air flow sensor 32 and the like, and the target supercharging pressure is set in accordance with the engine revolution detected by the engine revolution sensor 9 and the obtained engine load. Further, the basic opening degree of the wastegate valve 47 is set in accordance with the engine revolution and the engine load.

In Step S3, the exhaust cut valve 43 is set to the open state or the closed state in accordance with whether the engine revolution is higher or lower than the predetermined revolution N1. To be specific, the exhaust cut valve 43 is set to the open state in the open operation range, and the exhaust cut valve 43 is set to the closed state in the closed operation range.

In Step S4, the feedback amount (opening degree) is calculated in accordance with the pressure value obtained by subtracting the actual supercharging pressure, detected by the supercharging pressure detection sensor 36, from the target supercharging pressure.

In Step S5, the target opening degree of the wastegate valve 47 is set by correcting the basic opening degree based on the calculated feedback amount.

In Step S6, the drive duty ratio for the wastegate valve drive motor 47a is calculated in accordance with the set target opening degree. At this time, the drive duty ratio is adjusted in accordance with the actual opening degree detected by the wastegate valve opening degree sensor 47b.

In Step S7, the wastegate valve drive motor 47a is driven at the adjusted drive duty ratio. Then, the process returns to Step S1.

In the present embodiment, the control unit 100 determines whether the exhaust cut valve 43 is normal or in failure. In this case, the sensor value of the exhaust cut valve position sensor 43b is not used. This is because: as described above, the exhaust cut valve position sensor 43b detects the slide position of the slide member directly driven by the exhaust cut valve drive motor 43a; and for example, if the link mechanism connecting the slide member and the valve main body is damaged, it is difficult to detect the failure of the exhaust cut valve 43 by the exhaust cut valve position sensor 43b.

Specifically, the control unit 100 determines whether or not an abnormal state occurs in each of the open operation range and the closed operation range, the abnormal state being a state where although the feedback control is such that the feedback amount for closing the wastegate valve 47 (since this feedback amount is a negative value in the present embodiment, an absolute value thereof is used (the same shall apply hereinafter)) is not less than a predetermined amount, the actual supercharging pressure is lower than the target supercharging pressure, and the deviation between the actual supercharging pressure and the target supercharging pressure is maintained at not less than a predetermined value (i.e., although the feedback amount is large, the actual supercharging pressure is maintained low and does not converge to the target supercharging pressure). Hereinafter, the deviation between the actual supercharging pressure and the target supercharging pressure (the actual supercharging pressure is lower than the target supercharging pressure) when the feedback amount for closing the wastegate valve 47 is not less than the predetermined amount is simply referred to as a "deviation."

The above predetermined amount denotes an amount that is close to the above-described closed-side maximum feedback amount when the feedback amount is the negative value and denotes such an amount that when the exhaust cut valve 43 is normal, the deviation becomes smaller than the predetermined value by the feedback control in which the feedback amount is the predetermined amount. It should be noted that the predetermined amount may be the closed-side maximum feedback amount. When the predetermined amount is the closed-side maximum feedback amount, the feedback amount for closing the wastegate valve 47 being not less than the predetermined amount denotes that the feedback amount for closing the wastegate valve 47 is the closed-side maximum feedback amount.

Further, as shown in a column "Determination" of Cases 1 to 7 in Table 1, the control unit 100 determines whether the exhaust cut valve 43 is normal or in failure, based on results of the determinations in the above two operation ranges.

TABLE 1

| | Deviation between actual supercharging pressure and target supercharging pressure when feedback amount is not less than predetermined amount | | |
|---|---|---|---|
| Cases | Closed operation range | Open operation range | Determination |
| 1 | Small deviation | Small deviation | Normal |
| 2 | Large deviation | Small deviation | Exhaust cut valve is stuck in open state |
| 3 | Small deviation | Large deviation | Exhaust cut valve is stuck in closed state |
| 4 | Large deviation only at initial stage after range shift | Small deviation | Delay failure of operation of shifting from open state to closed state |
| 5 | Small deviation | Large deviation only at initial stage after range shift | Delay failure of operation of shifting from closed state to open state |
| 6 | Large deviation only at initial stage after range shift | Large deviation only at initial stage after range shift | Delay failure of operations of shifting from open state to closed state and from closed state to open state |
| 7 | Large deviation | Large deviation | Exhaust cut valve is stuck in intermediate opening degree state, or control system for wastegate valve (except for exhaust cut valve) is in failure |

In Table 1, "Large deviation" denotes that although the feedback control is performed, the deviation is maintained at not less than the predetermined amount, and "Small deviation" denotes that the deviation is smaller than the predetermined amount.

In Case 1, the deviation becomes smaller than the predetermined value by the feedback control in each of the open operation range and the closed operation range. In this case, the actual supercharging pressure is controlled so as to converge to the target supercharging pressure by the feedback control. In Case 1, the control unit 100 determines that the exhaust cut valve 43 is normal. Further, when the feedback amount becomes smaller than the predetermined amount by continuing the feedback control in each of the above operation ranges, the control unit 100 determines that the exhaust cut valve 43 is normal. In Table 1, "Small deviation" may be replaced with "Small deviation" or "Feedback amount became smaller than predetermined amount."

In Case 2, the deviation becomes smaller than the predetermined value by the feedback control in the open operation range (or the feedback amount becomes smaller than the predetermined amount), but the deviation is maintained at not less than the predetermined value in the closed operation range. In this case, since the exhaust cut valve 43 is in the open state in the open operation range, the actual supercharging pressure is controlled so as to converge to the target supercharging pressure by the feedback control. However, since the exhaust cut valve 43 is in the open state even in the closed operation range, the abnormal state occurs, that is, the deviation is maintained at not less than the predetermined value even by the feedback control in which the feedback amount is not less than the predetermined amount. Therefore, in Case 2, the control unit 100 determines that the exhaust cut valve 43 is stuck in the open state. To be specific, when the control unit 100 determines that the abnormal state occurs only in the closed operation range out of the above two operation ranges, the control unit 100 determines that the exhaust cut valve 43 is stuck in the open state.

In Case 3, the deviation becomes smaller than the predetermined value by the feedback control in the closed operation range (or the feedback amount becomes smaller than the predetermined amount), but the deviation is maintained at not less than the predetermined value in the open operation range. In this case, since the exhaust cut valve 43 is in the closed state in the closed operation range, the actual supercharging pressure is controlled so as to converge to the target supercharging pressure by the feedback control. However, since the exhaust cut valve 43 is in the closed state even in the open operation range, the abnormal state occurs, that is, the deviation is maintained at not less than the predetermined value even by the feedback control in which the feedback amount is not less than the predetermined amount. Therefore, in Case 3, the control unit 100 determines that the exhaust cut valve 43 is stuck in the closed state. To be specific, when the control unit 100 determines that the abnormal state occurs only in the open operation range out of the above two operation ranges, the control unit 100 determines that the exhaust cut valve 43 is stuck in the closed state.

In the present embodiment, until a first predetermined time t1 since the shifting of the operation range to the open operation range or the closed operation range elapses (the first predetermined time t1 is substantially equal to a time it takes to complete the shifting of the exhaust cut valve 43 to the open state or the closed state and is, for example, five seconds), the control unit 100 does not determine whether or not the abnormal state occurs. To be specific, since the supercharging pressure is unstable until the first predetermined time t1 elapses since the shifting of the operation range, it is difficult to accurately determine whether or not the abnormal state occurs. Therefore, to make the supercharging pressure stable, the elapse of the first predetermined time t1 is awaited.

In Case 4, the deviation becomes smaller than the predetermined value by the feedback control in the open operation range (or the feedback amount becomes smaller than the predetermined amount) after the first predetermined time t1 elapses since the shifting to the open operation range, but the abnormal state occurs in the closed operation range, that is, after the first predetermined time t1 elapses since the shifting to the closed operation range, the deviation is maintained at not less than the predetermined value only within a second predetermined time t2 (15 to 20 seconds, for example) (only at an initial stage after the shifting to the closed operation range) since the elapse of the first predetermined time t1 (After the second predetermined time t2 since the elapse of the first predetermined time t1, a normal state is realized, that is, the feedback amount becomes smaller than the predetermined value, or the deviation becomes smaller than the predetermined value even when the feedback amount is not less than the predetermined value.). To be specific, in Case 4, when shifting from the open operation range to the closed operation range, the exhaust cut valve 43 shifts from the open state to the closed state by taking a time longer than the first predetermined time t1 (It should be noted that this shifting is completed within the second predetermined time t2 since the elapse of the first predetermined time t1.). In this case, since the abnormal state occurs only at the initial stage after the shifting to the closed operation range, the control unit 100 determines that a delay failure of an operation of shifting from the open state to the closed state by the exhaust cut valve 43 occurs. To be specific, when the control unit 100 determines after the first predetermined time t1 since the shifting of the operation range that the abnormal state occurs only within the second predetermined time t2 since the elapse of the first predetermined time t1 and only in the closed operation range out of the above two operation ranges, the control unit 100 determines that the delay failure of the operation of shifting from the open state to the closed state by the exhaust cut valve 43 occurs.

In Case 5, the deviation becomes smaller than the predetermined value by the feedback control in the closed operation range (or the feedback amount becomes smaller than the predetermined amount) after the first predetermined time t1 elapses since the shifting to the closed operation range, but the abnormal state occurs in the open operation range, that is, after the first predetermined time t1 elapses since the shifting to the open operation range, the deviation is maintained at not less than the predetermined value only within the second predetermined time t2 (only at the initial stage after the shifting to the open operation range) since the elapse of the first predetermined time t1 (To be specific, after the second predetermined time t2 since the elapse of the first predetermined time t1, a normal state is realized, that is, the feedback amount becomes smaller than the predetermined value, or the deviation becomes smaller than the predetermined value even when the feedback amount is not less than the predetermined value.). To be specific, in Case 5, when shifting from the closed operation range to the open operation range, the exhaust cut valve 43 shifts from the closed state to the open state by taking a time longer than the first predetermined time t1 (It should be noted that this shifting is completed within the second predetermined time t2 since the elapse of the first predetermined time t1.). In this case, since the abnormal state occurs only at the initial stage after the shifting to the open operation range, the control unit 100 determines that a delay failure of an operation of shifting from the closed state to the open state by the exhaust cut valve 43 occurs. To be specific, when the control unit 100 determines after the first predetermined time t1 since the shifting of the operation range that the abnormal state occurs only within the second predetermined time since the elapse of the first predetermined time t1 and only in the open operation range out of the above two operation ranges, the control unit 100 determines that the delay failure of the operation of shifting from the closed state to the open state by the exhaust cut valve 43 occurs.

In Case 6, although the feedback control is performed, the abnormal state occurs in the closed operation range, that is, after the first predetermined time t1 elapses since the shifting to the closed operation range, the deviation is maintained at not less than the predetermined value only within the second predetermined time t2 (only at the initial stage after the shifting to the closed operation range) since the elapse of the first predetermined time t1, and the abnormal state occurs in the open operation range, that is, after the first predetermined time t1 elapses since the shifting to the open operation range, the deviation is maintained at not less than the predetermined value only within the second predetermined time t2 (only at the initial stage after the shifting to the open operation range) since the elapse of the first predetermined time t1. In this case, the control unit 100 determines that both the delay failure of the operation of shifting from the open state to the closed state by the exhaust cut valve 43 and the delay failure of the operation of shifting from the closed state to the open state by the exhaust cut valve 43 occur. To be specific, when the control unit 100 determines after the first predetermined time t1 since the shifting of the operation range that the abnormal state occurs only within the second predetermined time t2 since the elapse of the first predetermined time t1 and in each of the above two operation ranges, the control unit 100 determines that both the delay failure of the operation of shifting from the open state to the closed state by the exhaust cut valve 43 and the delay failure of the operation of shifting from the closed state to the open state by the exhaust cut valve 43 occur.

In Case 7, although the feedback control is performed, the deviation is maintained at not less than the predetermined value in each of the above two operation ranges. In this case, the control unit 100 determines that the exhaust cut valve 43 is stuck in a state between the open state and the closed state, or a feedback control system for the opening degree of the wastegate valve 47 other than the exhaust cut valve 43 is in failure (for example, the wastegate valve 47 itself is in failure, or the wastegate valve opening degree sensor 47b is in failure). To be specific, when the control unit 100 determines that the abnormal state occurs in each of the above two operation ranges, the control unit 100 determines that the exhaust cut valve 43 is stuck in a state between the open state and the closed state, or the feedback control system for the opening degree of the wastegate valve 47 other than the exhaust cut valve 43 is in failure.

Figure 6:
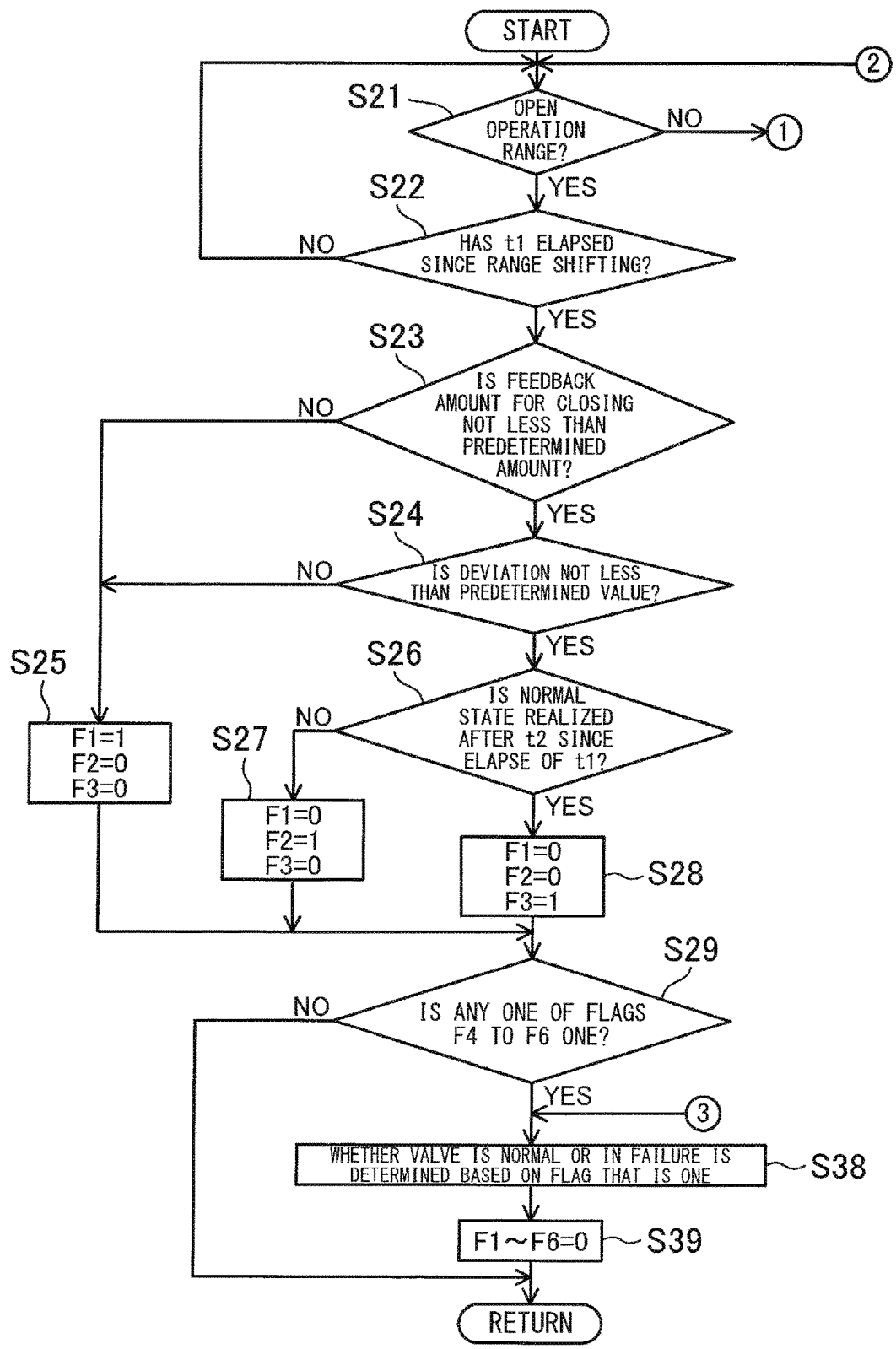
FIG. 6 is a flow chart showing a part of control operations for determining by the control unit whether the exhaust cut valve is normal or in failure.
Figure 7:
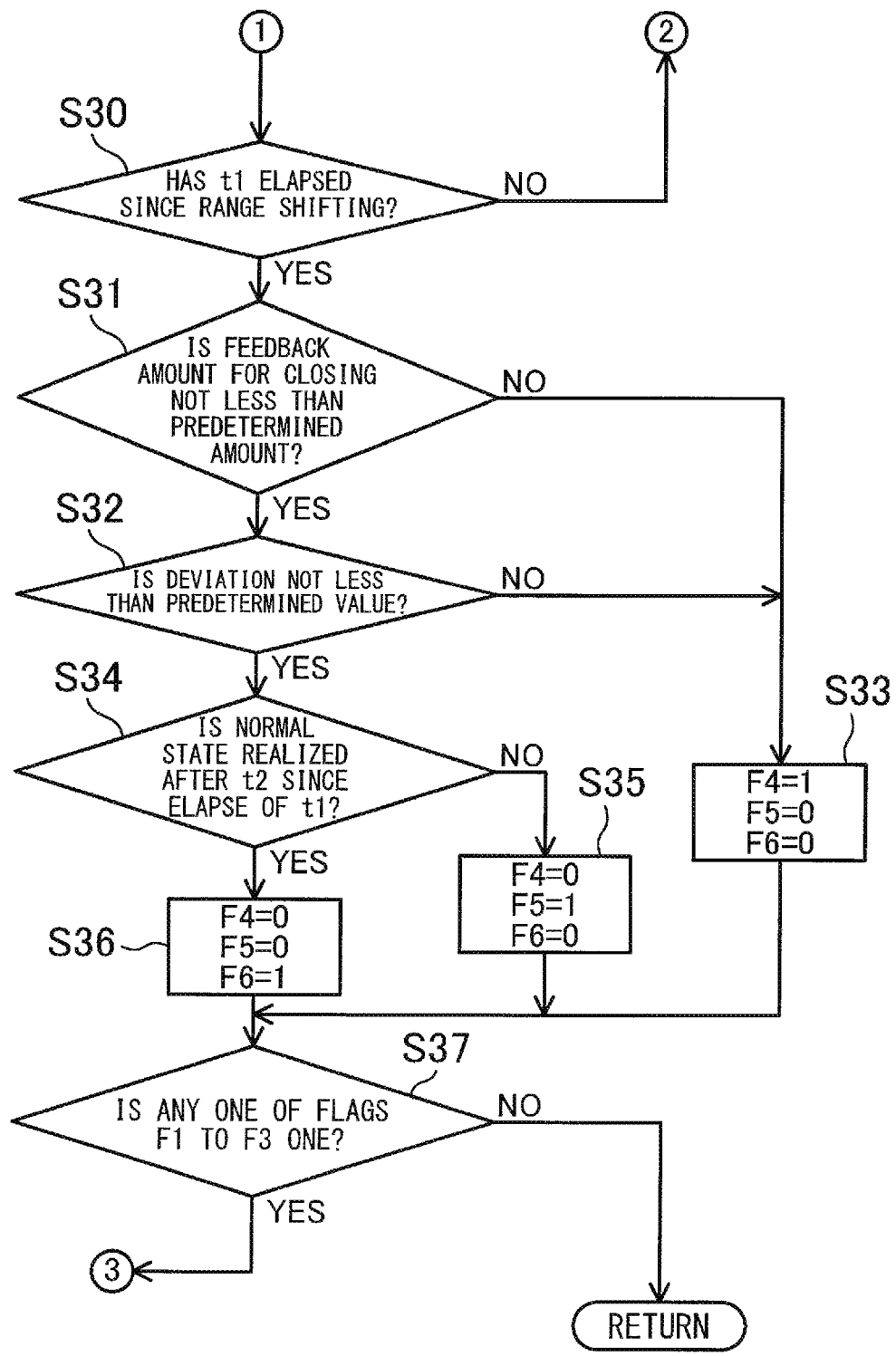
FIG. 7 is a flow chart showing a remaining part of the control operations for determining by the control unit whether the exhaust cut valve is normal or in failure.

Next, the control operation by the control unit 100 regarding whether the exhaust cut valve 43 is normal or in failure will be explained in reference to the flow charts of FIGS. 6 and 7.

In Step S21, whether or not the operation range of the engine 1 is the open operation range is determined. When the determination in Step S21 is YES, the process proceeds to Step S22. When the determination in Step S21 is NO, the process proceeds to Step S30.

In Step S22, whether or not the first predetermined time t1 has elapsed since the range shifting to the open operation range is determined. When the determination in Step S22 is NO, the process returns to Step S21. When the determination in Step S22 is YES, the process proceeds to Step S23.

In Step S23, whether or not the feedback amount for closing the wastegate valve 47 is not less than the predetermined amount is determined. When the determination in Step S23 is YES, the process proceeds to Step S24. When the determination in Step S23 is NO, the process proceeds to Step S25.

In Step S24, whether or not the deviation is not less than the predetermined value is determined. When the determination in Step S24 is NO, the process proceeds to Step S25. When the determination in Step S24 is YES, the process proceeds to Step S26.

In Step S25, a first flag F1 is set to one, and each of second and third flags F2 and F3 is set to zero. Then, the process proceeds to Step S29.

In Step S26, whether or not the abnormal state is not occurring after the second predetermined time t2 since the elapse of the first predetermined time t1 (whether or not the normal state is realized by continuing the feedback control, that is, the feedback amount becomes smaller than the predetermined value, or the deviation becomes smaller than the predetermined value although the feedback amount is not less than the predetermined value) is determined. When the determination in Step S26 is NO, the process proceeds to Step S27. In Step S27, each of the first and third flags F1 and F3 is set to zero, and the second flag F2 is set to one. Then, the process proceeds to Step S29. When the determination in Step S26 is YES, the process proceeds to Step S28. In Step S28, each of the first and second flags F1 and F2 is set to zero, and the third flag F3 is set to one. Then, the process proceeds to Step S29.

In Step S29, whether or not any one of fourth to sixth flags is one is determined. When the determination in Step S29 is NO, the process returns to Step S21. When the determination in Step S29 is YES, the process proceeds to Step S38.

In Step S30 to which the process proceeds when the determination in Step S21 is NO, whether or not the first predetermined time t1 has elapsed since the range shifting to the closed operation range is determined. When the determination in Step S30 is NO, the process returns to Step S21. When the determination in Step S30 is YES, the process proceeds to Step S31.

In Step S31, whether or not the feedback amount for closing the wastegate valve 47 is not less than the predetermined amount is determined. When the determination in Step S31 is YES, the process proceeds to Step S32. When the determination in Step S31 is NO, the process proceeds to Step S33.

In Step S32, whether or not the deviation is not less than the predetermined value is determined. When the determination in Step S32 is NO, the process proceeds to Step S33. When the determination in Step S32 is YES, the process proceeds to Step S34.

In Step S33, the fourth flag F1 is set to one, and each of the fifth and sixth flags F5 and F6 is set to zero. Then, the process proceeds to Step S37.

In Step S34, whether or not the abnormal state is not occurring after the second predetermined time t2 since the elapse of the first predetermined time t1 (whether or not the normal state is realized by continuing the feedback control, that is, the feedback amount becomes smaller than the predetermined value, or the deviation becomes smaller than the predetermined value although the feedback amount is not less than the predetermined value) is determined. When the determination in Step S34 is NO, the process proceeds to Step S35. In Step 35, each of the fourth and sixth flags F4 and F6 is set to zero, and the fifth flag F5 is set to one. Then, the process proceeds to Step S37. When the determination in Step S34 is YES, the process proceeds to Step S36. In Step S36, each of the fourth and fifth flags F4 and F5 is set to zero, and the sixth flag F6 is set to one. Then, the process proceeds to Step S37.

In Step S37, whether or not any one of the first to third flags is one is determined. When the determination in Step S37 is NO, the process returns to Step S21. When the determination in Step S37 is YES, the process proceeds to Step S38.

In Step S38, whether the exhaust cut valve 43 is normal or in failure is determined in accordance with the flag that is one.

To be specific, when each of the first flag F1 and the fourth flag F4 is one (i.e., in Case 1 described above), it is determined that the exhaust cut valve 43 is normal.

When each of the first flag F1 and the fifth flag F5 is one (i.e., in Case 2 described above), it is determined that the exhaust cut valve 43 is stuck in the open state.

When each of the second flag F2 and the fourth flag F4 is one (i.e., in Case 3 described above), it is determined that the exhaust cut valve 43 is stuck in the closed state.

When each of the first flag F1 and the sixth flag F6 is one (i.e., in Case 4 described above), it is determined that the delay failure of the operation of shifting from the open state to the closed state by the exhaust cut valve 43 occurs.

When each of the third flag F3 and the fourth flag F4 is one (i.e., in Case 5 described above), it is determined that the delay failure of the operation of shifting from the closed state to the open state by the exhaust cut valve 43 occurs.

When each of the third flag F3 and the sixth flag F6 is one (i.e., in Case 6 described above), it is determined that both the delay failure of the operation of shifting from the open state to the closed state by the exhaust cut valve 43 and the delay failure of the operation of shifting from the closed state to the open state by the exhaust cut valve 43 occur.

When each of the second flag F2 and the fifth flag F5 is one (i.e., in Case 7 described above), it is determined that the exhaust cut valve 43 is stuck in a state (intermediate opening degree) between the open state and the closed state, or the feedback control system for the opening degree of the wastegate valve 47 other than the exhaust cut valve 43 is in failure.

When the second flag F2 is one, and the fifth flag F5 is not one, the exhaust cut valve 43 is stuck in the closed state, so that the sixth flag F6 never becomes one (the delay failure of the operation of shifting from the open state to the closed state by the exhaust cut valve 43 does not occur). Similarly, when the fifth flag F5 is one, the third flag F3 never becomes one.

In Step S39, each of the first to sixth flags F1 to F6 is set to zero. Then, the process returns to Step S21. It should be noted that each of the first to sixth flags F1 is set to zero when starting the engine 1.

For example, when the control unit 100 determines that any of the failures of the exhaust cut valve 43 occurs, the control unit 100 stops the feedback control and maintains the wastegate valve 47 in a completely open state in each of the open operation range and the closed operation range. Or, the control unit 100 may operate such that: when it is determined that the exhaust cut valve 43 is stuck in the open state, the feedback control is performed only in the open operation range; and when it is determined that the exhaust cut valve 43 is stuck in the closed state, the feedback control is performed only in the closed operation range. Or, the control unit 100 may operate such that: when it is determined that the delay failure of the operation of shifting from the open state to the closed state by the exhaust cut valve 43 occurs, the feedback control is stopped, and the wastegate valve 47 is maintained in the completely open state until the exhaust cut valve 43 becomes the closed state, and after the exhaust cut valve 43 becomes the closed state, the feedback control is performed; and it is determined that the delay failure of the operation of shifting from the closed state to the open state by the exhaust cut valve 43 occurs, the feedback control is stopped, and the wastegate valve 47 is maintained in the completely open state until the exhaust cut valve 43 becomes the open state, and after the exhaust cut valve 43 becomes the open state, the feedback control is performed.

For example, until the engine 1 stops, the control unit 100 continues the above control operation performed when it is determined that the exhaust cut valve 43 is in failure. During this control operation, the control unit 100 does not perform the determination regarding whether the exhaust cut valve 43 is normal or in failure. This determination regarding whether the exhaust cut valve 43 is normal or in failure is performed when the engine 1 is started again. At this time, when it is determined that the exhaust cut valve 43 is normal, the control unit 100 repeats the determination until it is determined that the exhaust cut valve 43 is in failure.

Therefore, in the present embodiment, whether or not the abnormal state occurs is determined in each of the open operation range and the closed operation range, the abnormal state being a state where although the feedback control in which the feedback amount for closing the wastegate valve 47 is not less than the predetermined amount is performed, the actual supercharging pressure is lower than the target supercharging pressure, and the deviation between the actual supercharging pressure and the target supercharging pressure is maintained at not less than the predetermined value. In addition, whether the exhaust cut valve 43 is normal or in failure is determined based on the results of the determinations in the above two operation ranges. In each of the operation ranges, when the actual supercharging pressure does not converge to the target supercharging pressure although the feedback amount for closing the wastegate valve 47 is large, it is determined in consideration of the feedback amount that the abnormal state occurs. Therefore, whether or not the abnormal state occurs can be accurately determined. Further, based on the results of the determinations regarding whether or not the abnormal state occurs in each of the two operation ranges, whether the exhaust cut valve 43 is normal or in failure is determined. Therefore, whether the exhaust cut valve 43 is normal or in failure can be accurately determined.

The present invention is not limited to the above embodiment and may be modified within the scope of claims.

The above-described embodiment is just one example, and the scope of the present invention should not be restrictively interpreted. The scope of the present invention is defined by the claims, and all the modifications and changes which come within the meaning and range of equivalency of the claims fall within the scope of the present invention.

INDUSTRIAL APPLICABILITY

The present invention is useful for a failure detector of a turbocharged engine, the failure detector including a valve control device which: switches an exhaust cut valve between an open state and a closed state in accordance with an operation range of an engine; and performs feedback control for an opening degree of a wastegate valve such that actual supercharging pressure detected by a supercharging pressure detector becomes target supercharging pressure preset in accordance with an operation state of the engine in each of an open operation range where the exhaust cut valve becomes the open state and a closed operation range where the exhaust cut valve becomes the closed state.

LIST OF REFERENCE CHARACTERS 1 turbocharged engine
20 turbocharger 20a compressor
20b turbine
36 supercharging pressure detection sensor (supercharging pressure detector)
43 exhaust cut valve
46 exhaust bypass passage
47 wastegate valve
100 control unit (valve control device)

The invention claimed is:

1. A turbocharged engine with a turbocharger including a turbine disposed on an exhaust passage of the engine and a compressor disposed on an intake passage of the engine, an exhaust cut valve configured to be switched between an open state and a closed state to switch a flow velocity of an exhaust gas of the engine between two velocities that are high and low velocities in front of the turbine in the exhaust passage, an exhaust bypass passage through which the exhaust gas flows so as to bypass the turbine, a wastegate valve disposed on the exhaust bypass passage, a supercharging pressure detector configured to detect supercharging pressure of intake air supercharged by the compressor, and a valve control device for failure detection comprising:
a microcomputer including a CPU processor configured to:
switch the exhaust cut valve between the open state and the closed state in accordance with an operation range of the engine;
perform feedback control for an opening degree of the wastegate valve such that actual supercharging pressure detected by the supercharging pressure detector converges to target supercharging pressure preset in accordance with an operation state of the engine in each of an open operation range where the exhaust cut valve becomes the open state and a closed operation range where the exhaust cut valve becomes the closed state;
determine whether or not an abnormal state occurs in each of the closed operation range and the open operation range, the abnormal state being a state where although the feedback control in which a feedback amount for closing the wastegate valve is not less than a predetermined amount is performed, the actual supercharging pressure is lower than the target supercharging pressure, and a deviation between the actual supercharging pressure and the target supercharging pressure is maintained at not less than a predetermined value; and
determine based on results of the determinations in the above two operation ranges whether the exhaust cut valve is normal or in failure.

2. The turbocharged engine according to claim 1, wherein when the valve control device determines that the abnormal state occurs only in the closed operation range out of the above two operation ranges, the valve control device determines that the exhaust cut valve is stuck in the open state.

3. The turbocharged engine according to claim 1, wherein when the valve control device determines that the abnormal state occurs only in the open operation range out of the above two operation ranges, the valve control device determines that the exhaust cut valve is stuck in the closed state.

4. The turbocharged engine according to claim 1, wherein until a first predetermined time elapses since shifting of the operation range to the open operation range or the closed operation range, the valve control device does not determine whether or not the abnormal state occurs.

5. The turbocharged engine according to claim 4, wherein the valve control device is configured such that:
when the valve control device determines after the first predetermined time since the shifting of the operation range that the abnormal state occurs only within a second predetermined time since the elapse of the first predetermined time and only in the closed operation range out of the above two operation ranges, the valve control device determines that a delay failure of an operation of shifting from the open state to the closed state by the exhaust cut valve occurs;
when the valve control device determines after the first predetermined time since the shifting of the operation range that the abnormal state occurs only within the second predetermined time since the elapse of the first predetermined time and only in the open operation range out of the above two operation ranges, the valve control device determines that a delay failure of an operation of shifting from the closed state to the open state by the exhaust cut valve occurs; and
when the valve control device determines after the first predetermined time since the shifting of the operation range that the abnormal state occurs only within the second predetermined time since the elapse of the first predetermined time and in each of the above two operation ranges, the valve control device determines that both the delay failure of the operation of shifting from the open state to the closed state by the exhaust cut valve and the delay failure of the operation of shifting from the closed state to the open state by the exhaust cut valve occur.

6. The turbocharged engine according to claim 1, wherein when the valve control device determines that the abnormal state occurs in each of the operation ranges, the valve control device determines that the exhaust cut valve is stuck in a state between the open state and the closed state, or a feedback control system for the opening degree of the wastegate valve is in failure.

* * * * *